US012561764B2

(12) United States Patent
Wang

(10) Patent No.: US 12,561,764 B2
(45) Date of Patent: Feb. 24, 2026

(54) FILTERING METHOD AND APPARATUS, COMPUTER-READABLE MEDIUM

(71) Applicant: Tencent Technology (Shenzhen) Company Limited, Guangdong (CN)

(72) Inventor: Liqiang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 298 days.

(21) Appl. No.: 18/244,840

(22) Filed: Sep. 11, 2023

(65) Prior Publication Data

US 2024/0144439 A1     May 2, 2024

Related U.S. Application Data

(63) Continuation of application No. PCT/CN2022/118311, filed on Sep. 13, 2022.

(30) Foreign Application Priority Data

Sep. 28, 2021     (CN) .......................... 202111144704.2

(51) Int. Cl.
G06T 5/60          (2024.01)
G06N 3/04          (2023.01)
(Continued)

(52) U.S. Cl.
CPC .................. G06T 5/60 (2024.01); G06N 3/04 (2013.01); G06N 3/08 (2013.01); G06T 2207/20024 (2013.01); H04N 19/17 (2014.11)

(58) Field of Classification Search
CPC ............ G06T 5/60; G06T 2207/20024; H04N 19/117; H04N 19/124; H04N 19/80;
(Continued)

(56) References Cited

U.S. PATENT DOCUMENTS

2021/0136367 A9     5/2021   Na et al.
2021/0150767 A1     5/2021   Ikai et al.

FOREIGN PATENT DOCUMENTS

CN          110677624 A     1/2020
CN          110729734 A     1/2020
(Continued)

OTHER PUBLICATIONS

Liu, Chao, et al. "A QP-adaptive mechanism for CNN-based filter in video coding." 2022 IEEE International Symposium on Circuits and Systems (ISCAS). IEEE, 2022. (Year: 2020).*

(Continued)

*Primary Examiner* — Ross Varndell
(74) *Attorney, Agent, or Firm* — ArentFox Schiff LLP

(57) ABSTRACT

Some aspects of the disclosure provide a method of deep learning-based filtering. The method includes obtaining a reconstructed image corresponding to a coded image and at least a quantization parameter. At least a portion of the reconstructed image is reconstructed based on the quantization parameter. The method also includes generating an input to a deep learning filter according to a point multiplication operation of the reconstructed image and the at least the quantization parameter. The point multiplication operation includes pixel-wise multiplications of the at least the portion of the reconstructed image with the quantization parameter. Further, the method includes generating, by the deep learning filter and in response to the input, a filtered image corresponding to the reconstructed image. Apparatus and non-transitory computer-readable storage medium counterpart embodiments are also contemplated.

20 Claims, 11 Drawing Sheets

(51) Int. Cl.
    *G06N 3/08*     (2023.01)
    *H04N 19/17*     (2014.01)

(58) Field of Classification Search
    CPC .......... H04N 19/82; H04N 19/86; G06N 3/04;
                                 G06N 3/08
    See application file for complete search history.

(56)            References Cited

FOREIGN PATENT DOCUMENTS

| | | | | |
|---|---|---|---|---|
| CN | 111711824 A | * | 9/2020 | ............. G06N 3/045 |
| CN | 112218097 A | | 1/2021 | |
| CN | 113039792 A | | 6/2021 | |
| EP | 3451670 A1 | | 3/2019 | |

OTHER PUBLICATIONS

Bouaafia, Soulef, et al. "Deep learning-based video quality enhancement for the new versatile video coding." Neural Computing and Applications 34.17 (2022): 14135-14149. (Year: 2021).*

Office Action received for Chinese Patent Application No. 202111144704.2, mailed on May 8, 2024, 15 pages (5 pages of English Translation and 10 pages of Original Document).

Chang et al., "AHG11: Neural Network based Super Resolution for Video Coding Using Multiple Side Information", 27. JVET Meeting, No. JVET-AA0084 v1, m60054, Jul. 6, 2022, Available on internet at: https://jvet-experts.org/doc_end_user/ documents/27_ Teleconference/wg11/JVET-AA0084-v1.zip JVET-AA0084-v1. docx, Jul. 2022, 6 pages.

Extended European Search Report received for European Patent Application No. 22874609.5, mailed on Feb. 7, 2025, 13 pages.

Li et al., "AHG11: Conditional In-Loop Filter with Parameter Selection", 22. JVET Meeting, Teleconference, No. JVET-V0101, m56513, Available on internet at: https://jvet-experts.org/doc_end_ user/documents/22_Teleconference/wg11/JVET-V0101-v1.zip JVET-V0101.docx, Apr. 2021, 5 pages.

Li et al., "AHG11: Deep In-Loop Filter with Adaptive Model Selection and External Attention", 23 JVET Meeting; Teleconference, No. JVET-W0100V3; m57217, Available on internet at: https://jvet-experts.org/doc_end_user/documents/23_Teleconference/ wg11/JVET-W0100-v4.zip JVET-W0100-v4/JVET-W0100_r2. docx, Jul. 2021, 6 pages.

Office Action received for Chinese Patent Application No. 202111144704.2, mailed on Jan. 16, 2025, with English Translation, 33 pages.

Wang et al., "EE1-1.1-related: alternative filter designs", 25. JVET Meeting, Teleconference, No. JVET-Y0080 v3, Available on internet at: https://jvet-experts.org/doc_end_user/ documents/25_ Teleconference/wg11/JVET-Y0080-v3.zip JVET-Y0080.docx, Jan. 13, 2022.

Xu et al., "Non-CE10: A CNN based in-loop filter for intra frame", No. m48249, XP030205518, Available on internet at: http://phenix. int-evry.fr/mpeg/doc_end _user/documents/127_Gothenburg/wg11/ m48249-JVET-O0157-v1-JVET-O0157.zip JVET-O0157.docx, Jun. 2019, 5 pages.

* cited by examiner

To-be-filtered image → CNNLF → Filtered image a    b    c    d    e    f    g    h

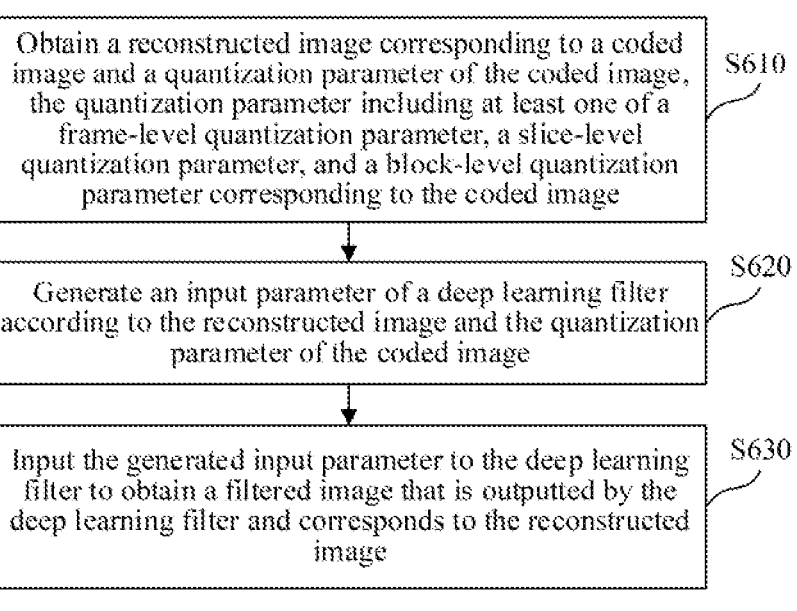

Obtain a reconstructed image corresponding to a coded image and a quantization parameter of the coded image, the quantization parameter including at least one of a frame-level quantization parameter, a slice-level quantization parameter, and a block-level quantization parameter corresponding to the coded image    S610

Generate an input parameter of a deep learning filter according to the reconstructed image and the quantization parameter of the coded image    S620

Input the generated input parameter to the deep learning filter to obtain a filtered image that is outputted by the deep learning filter and corresponds to the reconstructed image    S630

FIG. 6

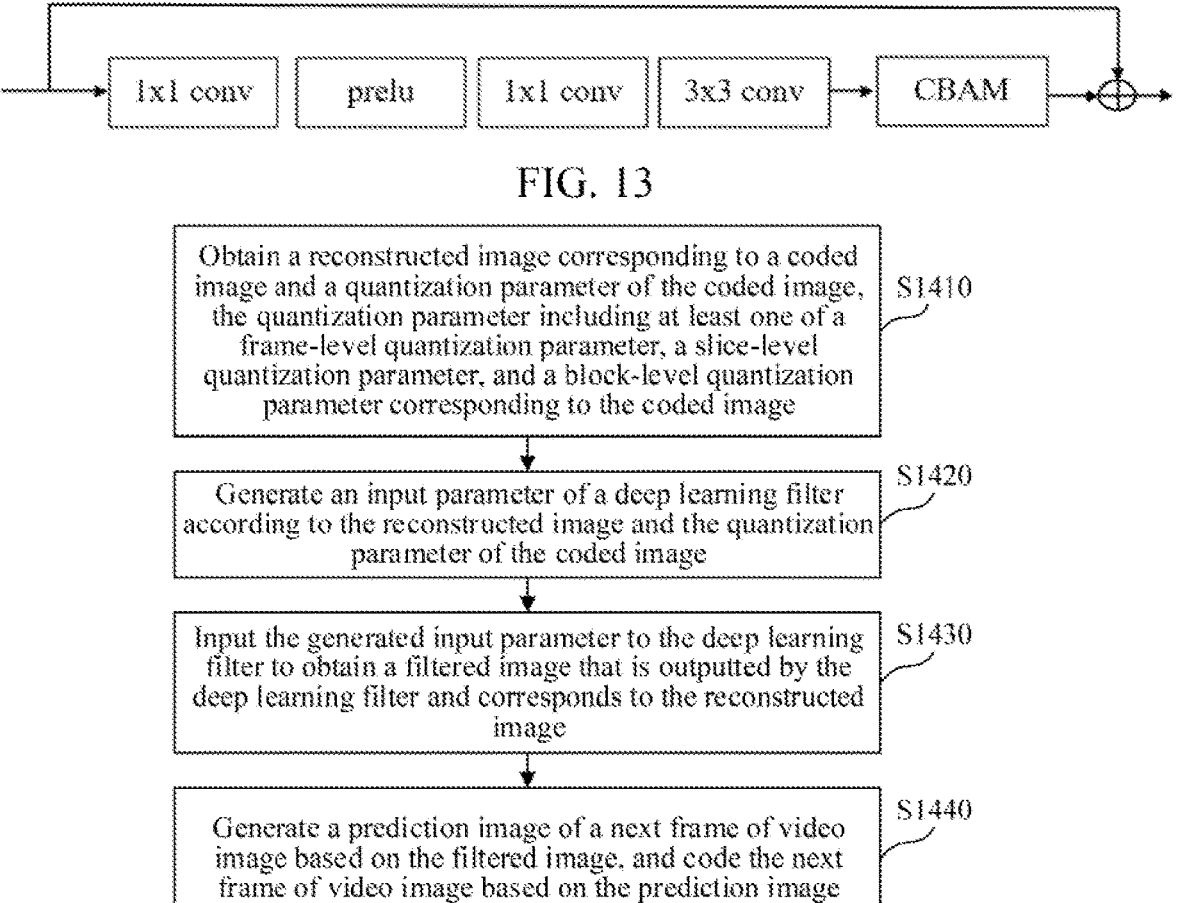

FIG. 13

| Obtain a reconstructed image corresponding to a coded image and a quantization parameter of the coded image, the quantization parameter including at least one of a frame-level quantization parameter, a slice-level quantization parameter, and a block-level quantization parameter corresponding to the coded image | S1410 |

| Generate an input parameter of a deep learning filter according to the reconstructed image and the quantization parameter of the coded image | S1420 |

| Input the generated input parameter to the deep learning filter to obtain a filtered image that is outputted by the deep learning filter and corresponds to the reconstructed image | S1430 |

| Generate a prediction image of a next frame of video image based on the filtered image, and code the next frame of video image based on the prediction image | S1440 |

FIG. 14

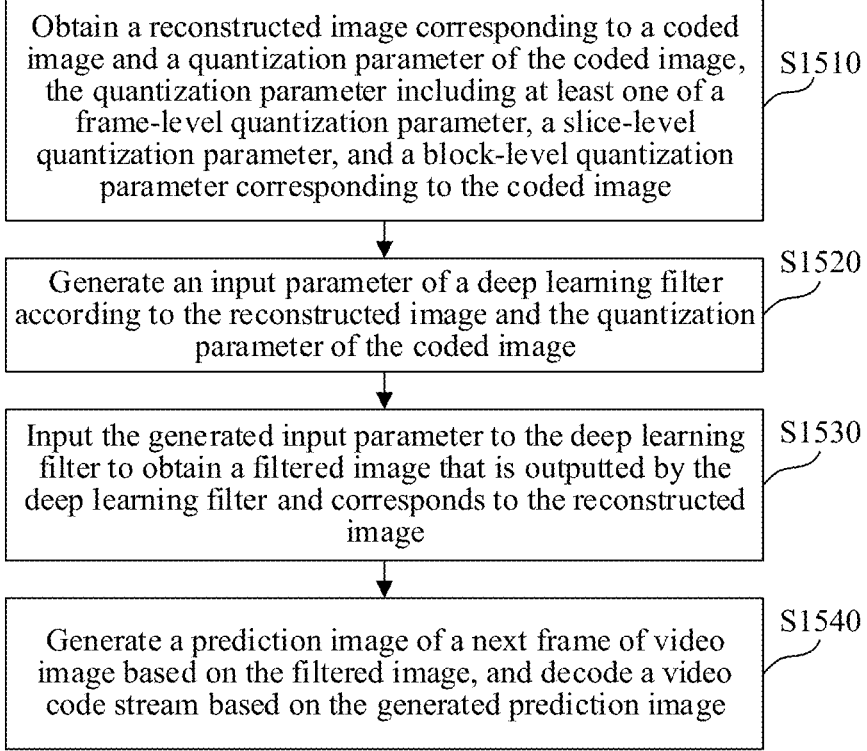

Obtain a reconstructed image corresponding to a coded image and a quantization parameter of the coded image, the quantization parameter including at least one of a frame-level quantization parameter, a slice-level quantization parameter, and a block-level quantization parameter corresponding to the coded image    S1510

Generate an input parameter of a deep learning filter according to the reconstructed image and the quantization parameter of the coded image    S1520

Input the generated input parameter to the deep learning filter to obtain a filtered image that is outputted by the deep learning filter and corresponds to the reconstructed image    S1530

Generate a prediction image of a next frame of video image based on the filtered image, and decode a video code stream based on the generated prediction image    S1540

FIG. 15

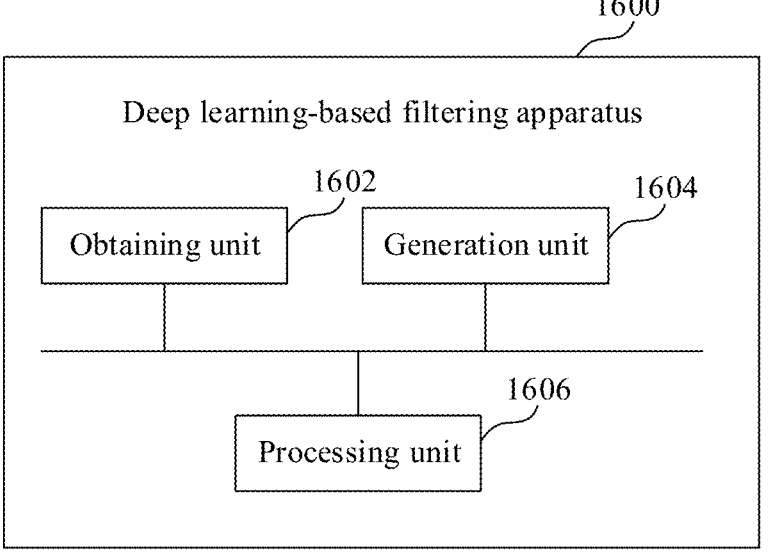

1600

Deep learning-based filtering apparatus

1602    Obtaining unit

1604    Generation unit

1606    Processing unit

FILTERING METHOD AND APPARATUS, COMPUTER-READABLE MEDIUM

RELATED APPLICATIONS

The present application is a continuation of International Application No. PCT/CN2022/118311, entitled "FILTER-ING METHOD AND APPARATUS, ENCODING METHOD AND APPARATUS, DECODING METHOD AND APPARATUS, COMPUTER-READABLE MEDIUM, AND ELECTRONIC DEVICE" and filed on Sep. 13, 2022, which claims priority to Chinese Patent Application No. 202111144704.2, entitled "FILTERING, CODING AND DECODING METHODS AND APPARA-TUSES, COMPUTER-READABLE MEDIUM, AND ELECTRONIC DEVICE" and filed on Sep. 28, 2021. The entire disclosures of the prior applications are hereby incor-porated by reference in their entirety.

FIELD OF THE TECHNOLOGY

This application relates to the technical field of computers and communication, including filtering, coding and decod-ing methods and apparatuses, a computer-readable medium, and an electronic device.

BACKGROUND OF THE DISCLOSURE

In the field of video coding and decoding, after a predic-tion image and a reconstructed residual image are superim-posed to generate a reconstructed image, it may be required to perform loop filtering on the reconstructed image in order to obtain an image with a better quality since the recon-structed image may be distorted. In the loop filtering, how to improve a filtering effect so as to improve coding and decoding efficiency is a technical problem to be solved.

SUMMARY

Embodiments of this disclosure provide filtering, coding and decoding methods and apparatuses, a non-transitory computer-readable storage medium, and an electronic device, which can improve a filtering effect at least to a certain extent, and thus are advantageous for improving video coding and decoding efficiency.

Some aspects of the disclosure provide a method of deep learning-based filtering. The method includes obtaining a reconstructed image corresponding to a coded image and at least a quantization parameter. At least a portion of the reconstructed image is reconstructed based on the quantiza-tion parameter. The method also includes generating an input to a deep learning filter according to a point multipli-cation operation of the reconstructed image and the at least the quantization parameter. The point multiplication opera-tion includes pixel-wise multiplications of the at least the portion of the reconstructed image with the quantization parameter. Further, the method includes generating, by the deep learning filter and in response to the input, a filtered image corresponding to the reconstructed image.

Some aspects of the disclosure provide an apparatus including processing circuitry. The processing circuitry is configured to obtain a reconstructed image corresponding to a coded image and at least a quantization parameter. The quantization parameter is used for a reconstruction of at least a portion of the reconstructed image. The processing cir-cuitry generates an input to a deep learning filter according to a point multiplication operation of the reconstructed image and the at least the quantization parameter, the point multiplication operation includes pixel-wise multiplications of the at least the portion of the reconstructed image with the quantization parameter. The processing circuitry generates, by the deep learning filter and in response to the input, a filtered image corresponding to the reconstructed image.

In the technical solutions provided by some embodiments of this disclosure, a reconstructed image corresponding to a coded image and a quantization parameter of the coded image are obtained, and the quantization parameter includes at least one of a frame-level quantization parameter, a slice-level quantization parameter, and a block-level quan-tization parameter corresponding to the coded image. Then an input parameter of a deep learning filter is generated according to the reconstructed image and the quantization parameter, and the input parameter is inputted to the deep learning filter to obtain a filtered image that is outputted by the deep learning filter and corresponds to the reconstructed image. Therefore, a fine-grained quantization parameter (namely, at least one of the frame-level quantization param-eter, the slice-level quantization parameter, and the block-level quantization parameter) directly affecting image qual-ity may be used as an input of the deep learning filter, and then the recognition accuracy of the deep learning filter on the inputted reconstructed image can be improved by intro-ducing the fine-grained quantization parameter, thereby improving a filtering effect and being advantageous for improving video coding and decoding efficiency.

It is to be understood that both the foregoing general description and the following detailed description are exem-plary and explanatory only and are not restrictive of this disclosure.

BRIEF DESCRIPTION OF THE DRAWINGS

FIG. 6 shows a flowchart of a deep learning-based filter-ing method according to an embodiment of this disclosure.

FIG. 13 shows a schematic structural diagram of a residual block according to another embodiment of this disclosure.

FIG. 14 shows a flowchart of a video coding method according to an embodiment of this disclosure.

FIG. 15 shows a flowchart of a video decoding method according to an embodiment of this disclosure.

FIG. 16 shows a block diagram of a deep learning-based filtering apparatus according to an embodiment of this disclosure.

DESCRIPTION OF EMBODIMENTS

Example implementations will now be described with reference to the accompanying drawings. However, the example implementations can be implemented in various forms and may not be construed as being limited to these examples.

Furthermore, the features, structures, or characteristics described herein may be combined in any suitable manner in one or more embodiments. In the following description, exemplary details are set forth in order to provide a understanding of some embodiments of this disclosure. However, it is noted that not all of the specific details of the embodiments may be used, that one or more specific details may be omitted, or that other methods, elements, apparatuses, steps, and the like may be employed in practicing the technical solutions of this disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

"A plurality" mentioned herein means two or more than two. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship.

Figure 1:
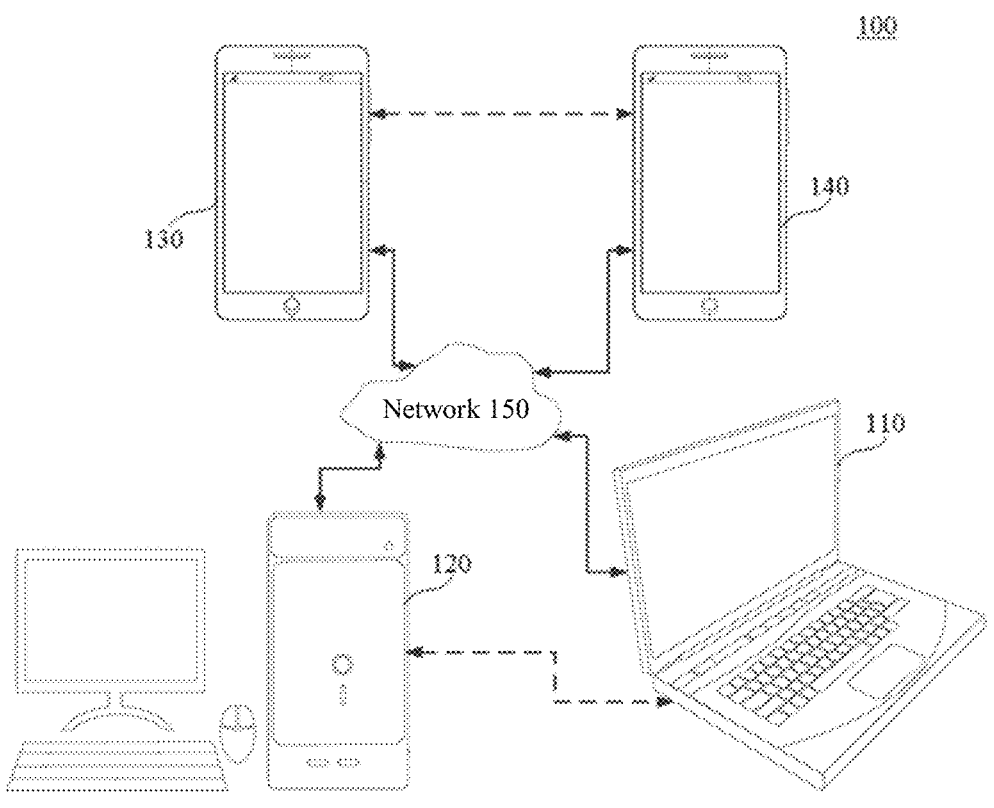
FIG. 1 shows a schematic diagram of an exemplary system architecture to which a technical solution according to an embodiment of this disclosure may be applied.

FIG. 1 shows a schematic diagram of an exemplary system architecture to which a technical solution according to an embodiment of this disclosure may be applied.

As shown in FIG. 1, a system architecture 100 includes a plurality of terminal apparatuses. The terminal apparatuses may communicate with each other through, for example, a network 150. For example, the system architecture 100 may include a first terminal apparatus 110 and a second terminal apparatus 120 interconnected through the network 150. In the embodiment of FIG. 1, the first terminal apparatus 110 and the second terminal apparatus 120 perform unidirectional data transmission.

For example, the first terminal apparatus 110 may code video data (for example, a video picture stream acquired by the terminal apparatus 110) for transmission over the network 150 to the second terminal apparatus 120. The coded video data is transmitted in one or more coded video streams. The second terminal apparatus 120 may receive the coded video data from the network 150, decode the coded video data to restore the video data, and display a video picture according to the restored video data.

In an embodiment of this disclosure, the system architecture 100 may include a third terminal apparatus 130 and a fourth terminal apparatus 140 that perform bi-directional transmission of the coded video data. The bi-directional transmission may occur, for example, during a video conference. For bi-directional data transmission, each of the third terminal apparatus 130 and the fourth terminal apparatus 140 may code video data (for example, a video picture stream acquired by the terminal apparatus) for transmission over the network 150 to the other of the third terminal apparatus 130 and the fourth terminal apparatus 140. Each of the third terminal apparatus 130 and the fourth terminal apparatus 140 may also receive the coded video data transmitted by the other of the third terminal apparatus 130 and the fourth terminal apparatus 140, may decode the coded video data to restore the video data, and may display a video picture on an accessible display apparatus according to the restored video data.

In the embodiment of FIG. 1, the first terminal apparatus 110, the second terminal apparatus 120, the third terminal apparatus 130, and the fourth terminal apparatus 140 may be a server, a personal computer and a smart phone, but the principles disclosed in this disclosure may not be limited thereto. Embodiments disclosed in this disclosure are applicable to laptop computers, tablet computers, media players, and/or dedicated video conferencing devices. The network 150 represents any number of networks that communicate the coded video data between the first terminal apparatus 110, the second terminal apparatus 120, the third terminal apparatus 130, and the fourth terminal apparatus 140, including, for example, wired and/or wireless communication networks. The communication network 150 may exchange data in circuit-switched and/or packet-switched channels. The network may include a telecommunications network, a local area network, a wide area network, and/or the Internet. For purposes of this disclosure, unless explained below, the architecture and topology of the network 150 may be insignificant to the operation disclosed in this disclosure.

Figure 2:
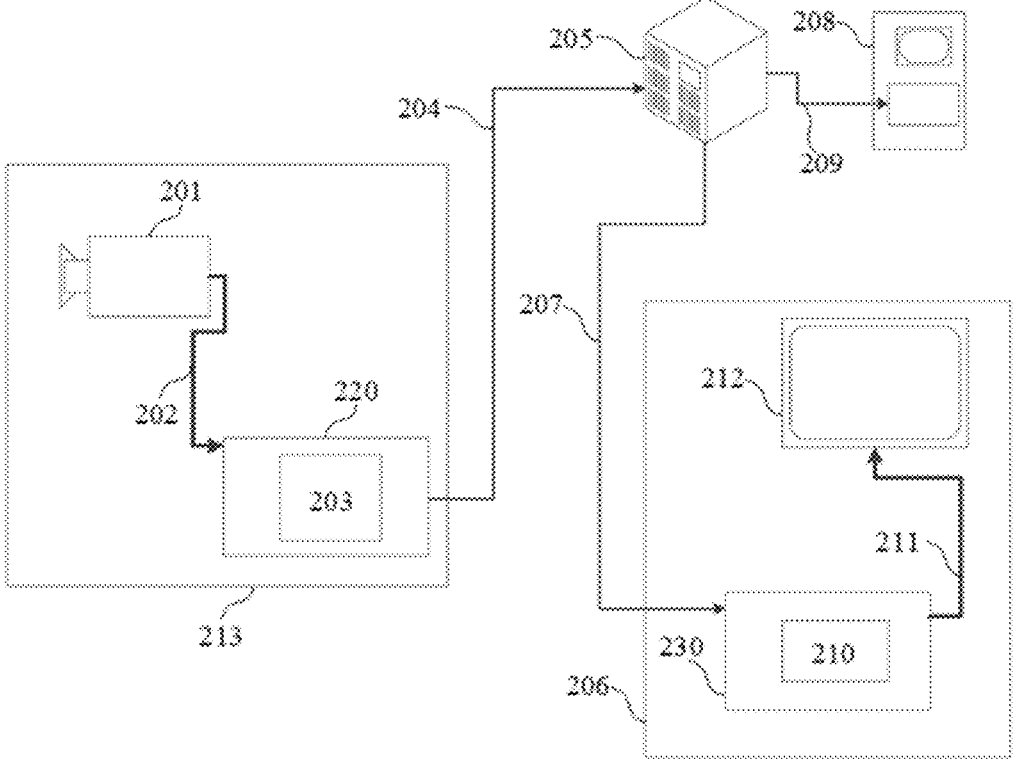
FIG. 2 shows a schematic diagram of placement modes of an exemplary video coding apparatus and an exemplary video decoding apparatus in a streaming transmission sys-tem.

In an embodiment of this disclosure, FIG. 2 shows placement modes of a video coding apparatus and a video decoding apparatus in a streaming transmission environment. The subject matter disclosed in this disclosure is equally applicable to other video-enabled applications including, for example, video conferencing, digital television (TV), storing compressed video on digital media including CD, DVD, memory sticks, and the like.

A streaming transmission system may include an acquisition subsystem 213. The acquisition subsystem 213 may include a video source 201, such as a digital camera. The video source creates an uncompressed video picture stream 202. In an embodiment, the video picture stream 202 includes samples taken by a digital camera. In contrast to coded video data 204 (or a coded video stream 204), the video picture stream 202 is depicted as a bold line to emphasize a high-data-volume video picture stream. The video picture stream 202 may be processed by an electronic apparatus 220. The electronic apparatus 220 includes a video coding apparatus 203 coupled to the video source 201. The video coding apparatus 203 may include hardware, software, or a combination of hardware and software to realize or implement aspects of the disclosed subject matter as described in more detail below. In contrast to the video picture stream 202, the coded video data 204 (or the coded video stream 204) is depicted as a thin line to emphasize low-data-volume coded video data 204 (or the coded video stream 204), which may be stored on a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the coded video data 204. The client subsystem 206 may include, for example, the video decoding apparatus 210 in the electronic apparatus 230. The video decoding apparatus 210 decodes the copy 207 of the coded video data and generates an output video picture stream 211 that may be presented on a display 212 (for example, a display screen) or another presentation apparatus. In some streaming transmission systems, the coded video data 204, video data 207 and video data 209 (for example, video streams) may be coded according to certain video coding/compression standards.

The electronic apparatus 220 and the electronic apparatus 230 may include other components not shown in the figures. For example, the electronic apparatus 220 may include a video decoding apparatus, and the electronic apparatus 230 may also include a video coding apparatus.

In an embodiment of this disclosure, taking an international video coding standard: High Efficiency Video Coding (HEVC), versatile video coding (VVC) and a Chinese national video coding standard AVS as examples, when a video frame image is inputted, the video frame image is divided into a number of non-overlapping processing units according to a block size, and each processing unit will perform a similar compression operation. This processing unit is referred to as a coding tree unit (CTU) or a largest coding unit (LCU). The CTU may then be more finely divided to obtain one or more basic coding units (CU). The CU is the most basic element of a coding link.

Some concepts in coding a CU are introduced below:

Predictive coding: the predictive coding includes intra-frame prediction, inter-frame prediction and other modes, and after an original video signal is predicted by a selected reconstructed video signal, a residual video signal is obtained. An encoder side needs to determine a corresponding predictive coding mode for the current CU and to inform of a decoder side. The intra-frame prediction means that a predicted signal comes from a region which has been coded and reconstructed in the same image. The inter-frame prediction means that a predicted signal comes from an already coded image (referred to as a reference image) different from a current image.

Transform & Quantization: after a residual video signal is subjected to transform operations such as discrete Fourier transform (DFT) and discrete cosine transform (DCT), the signal is converted into a transform domain, which is referred to as a transform coefficient. The transform coefficient is further subjected to a lossy quantization operation, and some information is lost, whereby a quantized signal is advantageous for compression expression. In some video coding standards, there may be more than one selectable transform mode. Therefore, the encoder side also needs to select one of the transform modes for the current CU and inform of the decoder side. The degree of refinement of quantization is usually determined by a quantization parameter (QP). A larger value of the QP indicates that coefficients within a larger range of values will be quantized into the same output. Therefore, more distortion and lower code rate will be brought usually. Conversely, a smaller value of the QP indicates that coefficients within a smaller range of values will be quantized into the same output. Therefore, less distortion will be brought usually while corresponding to a higher code rate.

Entropy coding or statistical coding: a quantized transform domain signal will be statistically compressed and coded according to the frequency of occurrence of each value, and finally a binary (0 or 1) compressed stream will be output. Meanwhile, other information is generated by coding. For example, a selected coding mode, motion vector data, and the like also need to be subjected to entropy coding to reduce the code rate. The statistical coding is a lossless coding mode, which can effectively reduce the code rate required to express the same signal. Common statistical coding modes include variable length coding (VLC) or context adaptive binary arithmetic coding (CABAC).

The context adaptive binary arithmetic coding (CABAC) process mainly includes three steps: binarization, context modeling, and binary arithmetic coding. After an inputted syntax element is binarized, binary data may be coded through a normal coding mode and a bypass coding mode. The bypass coding mode does not need to assign a specific probability model to each binary bit, and an inputted binary bit bin value is directly coded with a simple bypass coder to speed up the overall coding and decoding. In general, different syntax elements are not completely independent, and the same syntax element has some memorability. Therefore, according to a conditional entropy theory, conditional coding using other coded syntax elements can further improve coding performance compared to independent coding or memoryless coding. These coded information used as conditions are called contexts. In the conventional coding mode, binary bits of the syntax elements enter a context coder in sequence, and the coder assigns an appropriate probability model to each inputted binary bit according to the value of the previously coded syntax element or binary bit. The process is context modeling. A context model corresponding to the syntax element may be located through context index increment (ctxIdxInc) and context index start (ctxIdxStart). After the bin value and the assigned probability model are sent to a binary arithmetic coder for coding, the context model needs to be updated according to the bin value. This is an adaptive process in coding.

Loop filtering: a transformed and quantized signal is processed by inverse quantization, inverse transform, and predictive compensation to obtain a reconstructed image. The reconstructed image is different from an original image in part of the information due to the effect of quantization. That is, the reconstructed image is distorted. Therefore, the reconstructed image may be filtered by a deblocking filter (DB), a sample adaptive offset (SAO) filter, or an adaptive loop filter (ALF), and the like, thereby effectively reducing the degree of distortion generated by quantization. Since these filtered reconstructed images will be used as references for subsequent coded images to predict future image signals, the foregoing filtering operation is also referred to as loop filtering, namely a filtering operation within a coding loop.

Figures 3, 4, 5:
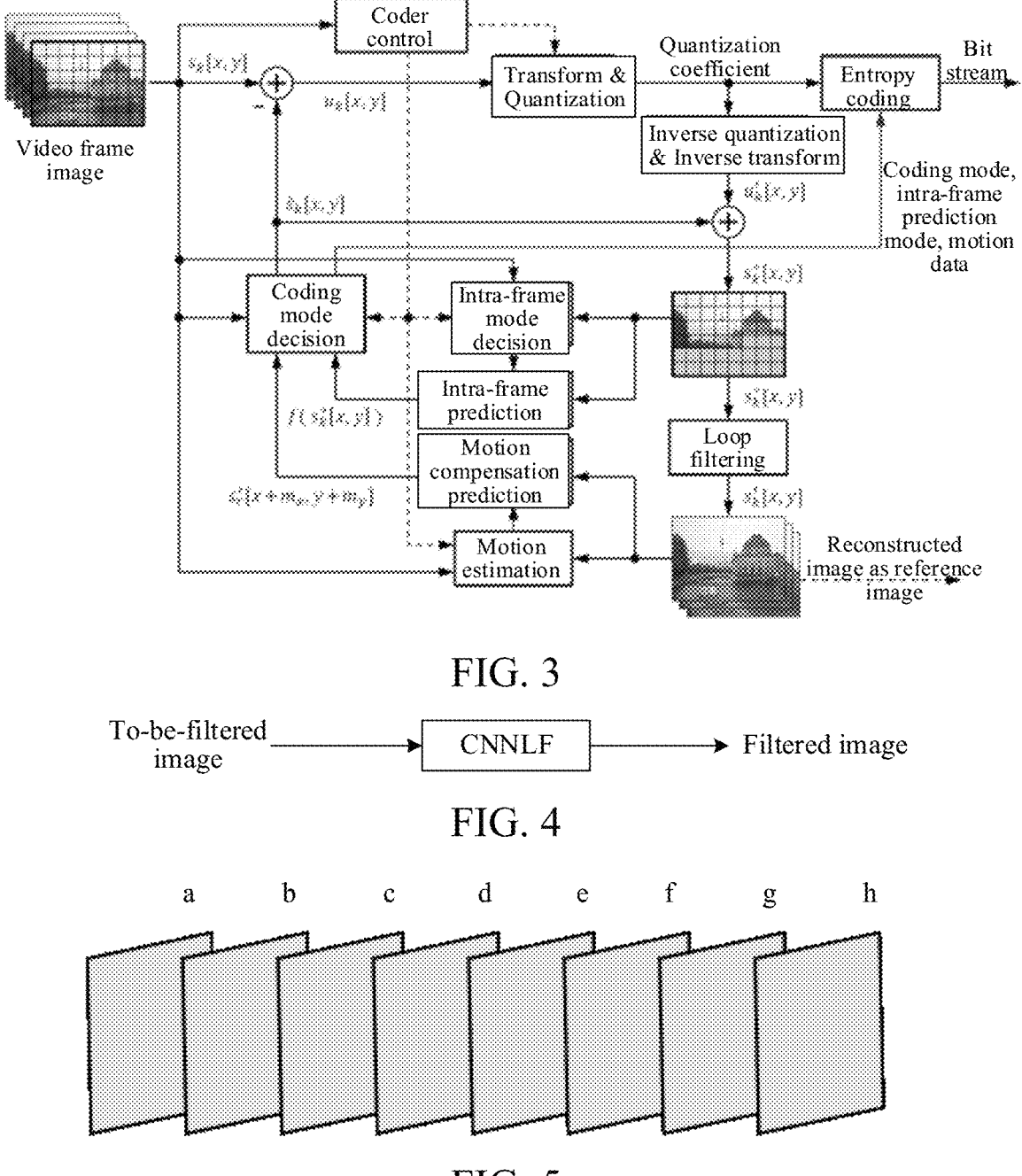
FIG. 3 shows a basic flowchart of an exemplary video coder.
FIG. 4 shows a schematic diagram of an example of CNNLF-based filtering processing.
FIG. 5 shows a schematic diagram of an exemplary frame-level quantization parameter of a sequence in an RA coding mode.

In an embodiment of this disclosure, FIG. 3 shows a basic flowchart of a video coder. In this flow, intra-frame prediction is exemplified. A difference operation is performed on an original image signal $s_k[x, y]$ and a prediction image signal $\hat{s}_k[x, y]$ to obtain a residual signal $u_k[x, y]$. The residual signal $u_k[x, y]$ is transformed and quantized to obtain a quantization coefficient. The quantization coefficient, on the one hand, obtains a coded bit stream through entropy coding, and on the other hand obtains a reconstructed residual signal $u'_k[x, y]$ through inverse quantization and inverse transform processing. The prediction image signal $\hat{s}_k[x, y]$ and the reconstructed residual signal $u'_k[x, y]$ are superimposed to generate a reconstructed image signal $s^*_k[x, y]$. The reconstructed image signal $s^*_k[x, y]$, on the one hand, is inputted to an intra-frame mode decision module and an intra-frame prediction module for intra-frame prediction processing, and filtered, on the other hand, through loop filtering to output a filtered image signal $s'_k[x, y]$. The filtered image signal $s'_k[x, y]$ may be used as a next frame of reference image for motion estimation and motion compensation prediction. Then, a next frame of prediction image signal $\hat{s}_k[x, y]$ is obtained based on a result $s'_r[x+m_x, y+m_y]$ of motion compensation prediction and a result $f(s^*_k[x, y])$ of intra-frame prediction, and the foregoing process is continuously repeated until the coding is completed.

The foregoing loop filtering may be implemented based on a convolutional neural network loop filter (CNNLF). A model structure of the CNNLF includes basic modules such as a convolutional layer, an activation function, a full connection layer, and a pooling layer. Model parameters need to be obtained through training. As shown in FIG. 4, after the CNNLF is trained, a to-be-filtered image may be inputted into the trained CNNLF, and finally a filtered image may be outputted.

When the CNNLF is used for filtering processing, a related technical solution is to train corresponding data of each sequence-level quantization parameter to obtain a deep learning filter, and then select the corresponding deep learning filter to perform filtering according to a value of the sequence-level quantization parameter. Another related technical solution is to train corresponding data of each (at least two) sequence-level quantization parameter(s) to obtain a deep learning filter, and then select the corresponding deep learning filter to perform filtering according to the value of the sequence-level quantization parameter. These solutions may input the sequence-level quantization parameters to train the deep learning filters, and accordingly, when using the deep learning filters, inputs of the deep learning filters need to contain the sequence-level quantization parameters as well.

Meanwhile, in a general test configuration of mainstream video coding standards, a random access (RA) mode is taken as an example. As shown in FIG. 5, the whole sequence of the RA coding mode has a common sequence-level quantization parameter, each frame has a corresponding frame-level quantization parameter (namely, a-h shown in FIG. 5), and the corresponding frame-level quantization parameters of all frames are not completely the same. The frame-level quantization parameters are obtained by adding an offset on the basis of the sequence-level quantization parameter. In order to improve the recognition accuracy of the deep learning filter on the inputted reconstructed image and improve the filtering effect and the video coding and decoding efficiency, the embodiments of this disclosure provide technical solutions of taking a finer-grained frame-level quantization parameter as an input of a deep learning filter, so as to improve the performance of the deep learning filter.

Deep learning belongs to the category of artificial intelligence (AI). Machine learning (ML) is the core of AI, is the fundamental way to make computers intelligent, and is applied in all fields of AI. The deep learning filter in the embodiments of this disclosure is a machine learning/deep learning-based filter.

The implementation details of the technical solutions of the embodiments of this disclosure are described in detail as follows.

FIG. 6 shows a flowchart of a deep learning-based filtering method according to an embodiment of this disclosure. The deep learning-based filtering method may be performed by a device having a processing function such as computing and storage. For example, the deep learning-based filtering method may be performed by a terminal device or a server. Referring to FIG. 6, the deep learning-based filtering method includes at least step S610 to step S630. A detailed description is as follows.

In step S610, a reconstructed image corresponding to a coded image and a quantization parameter of the coded image are obtained. The quantization parameter includes at least one of a frame-level quantization parameter, a slice-level quantization parameter, and a block-level quantization parameter corresponding to the coded image.

In an embodiment of this disclosure, the reconstructed image corresponding to the coded image is an image generated by superimposing a reconstructed residual image obtained after inverse quantization and inverse transform processing and a prediction image. For example, in the flow shown in FIG. 3, the reconstructed image is an image signal $s^*_k[x, y]$ generated by superimposing a prediction image signal $\hat{s}_k[x, y]$ and a reconstructed residual signal $u'_k[x, y]$.

In an embodiment of this disclosure, in addition to the frame-level quantization parameter, the slice-level quantization parameter, and the block-level quantization parameter, the quantization parameter of the coded image may also include a sequence-level quantization parameter corresponding to the coded image.

A video image frame sequence includes a series of image frames. Each image frame may be further divided into slices, which in turn may be divided into a series of LCUs (or CTUs). The LCU includes a number of CUs. The video image frame is coded in units of blocks at the time of coding. There is a macroblock (MB) in some new video coding standards such as standard H.264. The MB may be further divided into a plurality of prediction blocks which may be used for predictive coding. In the HEVC standard, the basic concepts of coding units (CU), prediction units (PU) and transform units (TU) are used to functionally divide a variety of block units, and a brand-new tree-based structure is used for description. For example, the CU may be divided into smaller CUs according to a quadtree, and the smaller CU may continue to be divided to form a quadtree structure. The blocks in the embodiments of this disclosure may be CUs, or smaller blocks than CUs, such as smaller blocks obtained by dividing CUs.

In an embodiment of this disclosure, the sequence-level quantization parameter is sequence-QP, and an image sequence shares the same sequence-level quantization parameter. That is, for image frames in an image sequence, the corresponding sequence-level quantization parameters are the same. The sequence-level quantization parameters corresponding to different image sequences may or may not be the same.

The frame-level quantization parameter is frame-QP, and is a quantization parameter corresponding to each image frame. The quantization parameters corresponding to different image frames may or may not be the same.

The slice-level quantization parameter is slice-QP, and blocks in one slice share the same slice-level quantization parameter. That is, for blocks in one slice, the corresponding block-level quantization parameters are the same. The sequence-level quantization parameters corresponding to different slices may or may not be the same. The block-level quantization parameter is block-QP, and the quantization parameters corresponding to different blocks may or may not be the same.

If an image frame is divided into a slice, the slice-level quantization parameter and the frame-level quantization parameter refer to the same parameter.

In step S620, an input parameter of a deep learning filter is generated according to the reconstructed image and the quantization parameter of the coded image.

Figure 7:
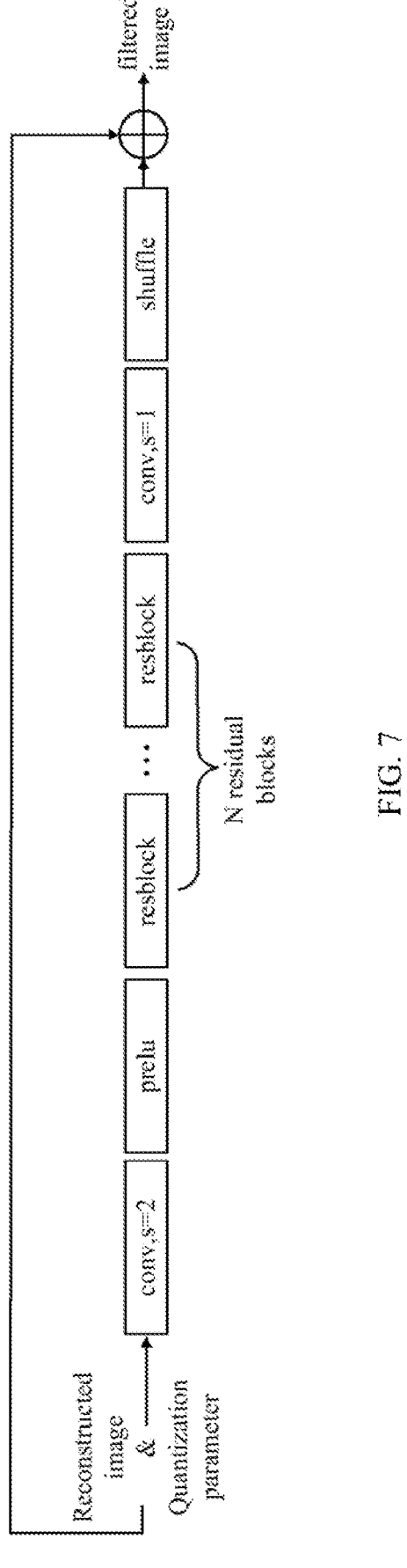
FIG. 7 shows a schematic diagram of generating an input parameter of a deep learning filter based on a reconstructed image and a quantization parameter of a coded image according to an embodiment of this disclosure.

In an embodiment of this disclosure, layer combination may be performed on the reconstructed image and the quantization parameter, and a result of the layer combination may be taken as the input parameter of the deep learning filter. As shown in FIG. 7, the reconstructed image and the quantization parameter may be combined as one layer, and then inputted into the deep learning filter.

In this embodiment, the deep learning filter includes a convolutional unit, a residual unit, and a shuffle unit connected in sequence. The convolutional unit includes a convolutional layer (cony) and a parametric rectified linear unit (prelu). The residual unit includes N residual blocks connected in sequence. The shuffle unit is a shuffle unit. The shuffle unit is capable of performing a shuffle ( ) function to shuffle elements in an array in a random order, where the image is up-sampled by shuffling.

In the embodiment shown in FIG. 7, the convolutional layer in the convolutional unit preceding the residual unit has a step size s=2. Another convolutional layer may alternatively be disposed between the residual unit and the shuffle unit. This convolutional layer has a step size s=1.

Figure 8:
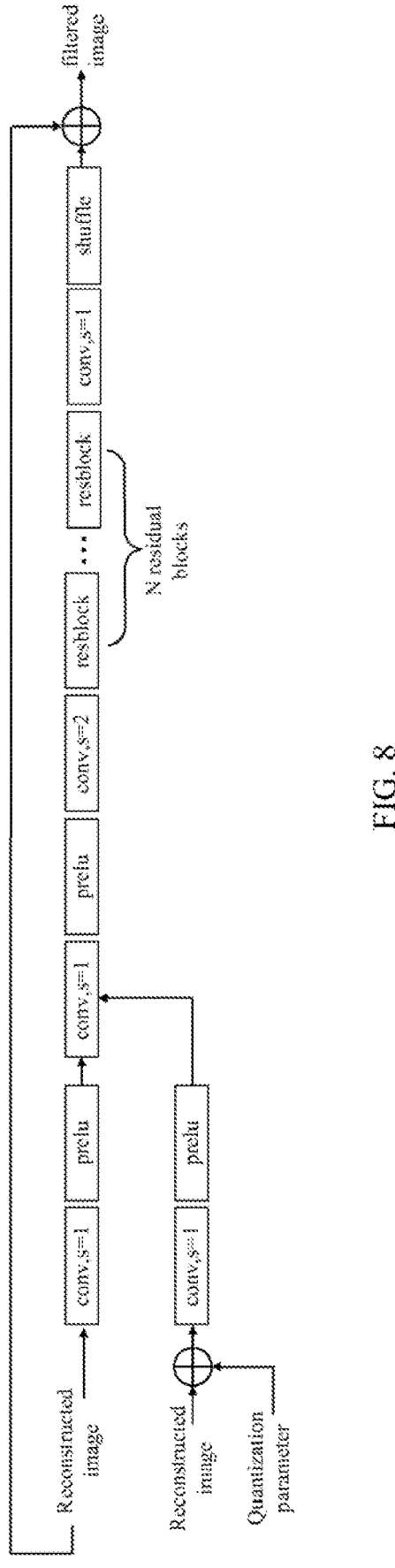
FIG. 8 shows a schematic diagram of generating an input parameter of a deep learning filter based on a reconstructed image and a quantization parameter of a coded image according to another embodiment of this disclosure.

In an embodiment of this disclosure, a point multiplication operation may be performed on the reconstructed image and the quantization parameter to obtain a point multiplication operation result. In some examples, the point multiplication operation can perform pixel-wise multiplications of two images. For example, the reconstructed image is a first image, and the quantization parameter(s) for the reconstructed image can form a second image of the same size as the first image, and the point multiplication operation can perform pixel-wise multiplications of the first image and the second image to obtain a resulting image of the same size as the first image and the second image. Specifically, a pixel in the resulting image has a first collocation pixel in the first image and a second collocated image in the second image. The value of the pixel in the resulting image is a multiplication of the first collocated pixel in the first image and the second collocated pixel in the second image. Then a convolutional operation may be performed on the point multiplication operation result, and then the input parameter of the deep learning filter may be generated according to features obtained by the convolutional operation and features of the reconstructed image. As shown in FIG. 8, after performing the point multiplication operation on the reconstructed image and the quantization parameter, features may be extracted by a convolutional unit (the convolutional unit includes a convolutional layer cony and a parametric rectified linear unit prelu, where the convolutional layer has a step size s=1). The features of the reconstructed image are extracted by a convolutional unit (the convolutional unit includes a convolutional layer cony and a parametric rectified linear unit prelu, where the convolutional layer has a step size s=1), and then the features extracted for the point multiplication operation result and the features extracted for the reconstructed image are inputted into the deep learning filter.

In the embodiment shown in FIG. 8, the deep learning filter includes a convolutional unit, a residual unit, and a shuffle unit connected in sequence. The convolutional unit includes a convolutional layer with a step size s=1, a parametric rectified linear unit prelu, and a convolutional layer with a step size s=2. The residual unit includes N residual blocks connected in sequence. The shuffle unit is a shuffle unit. In the embodiment shown in FIG. 8, a convolutional layer may alternatively be disposed between the residual unit and the shuffle unit. This convolutional layer has a step size s=1.

In an embodiment of this disclosure, reference information corresponding to the reconstructed image may be obtained. The reference information includes at least one of block division information and a prediction image. Then a convolutional operation is performed on the reference information to obtain features of the reference information, and then the input parameter of the deep learning filter is generated according to the features of the reference information, features of the reconstructed image, and the quantization parameter.

Figure 9:
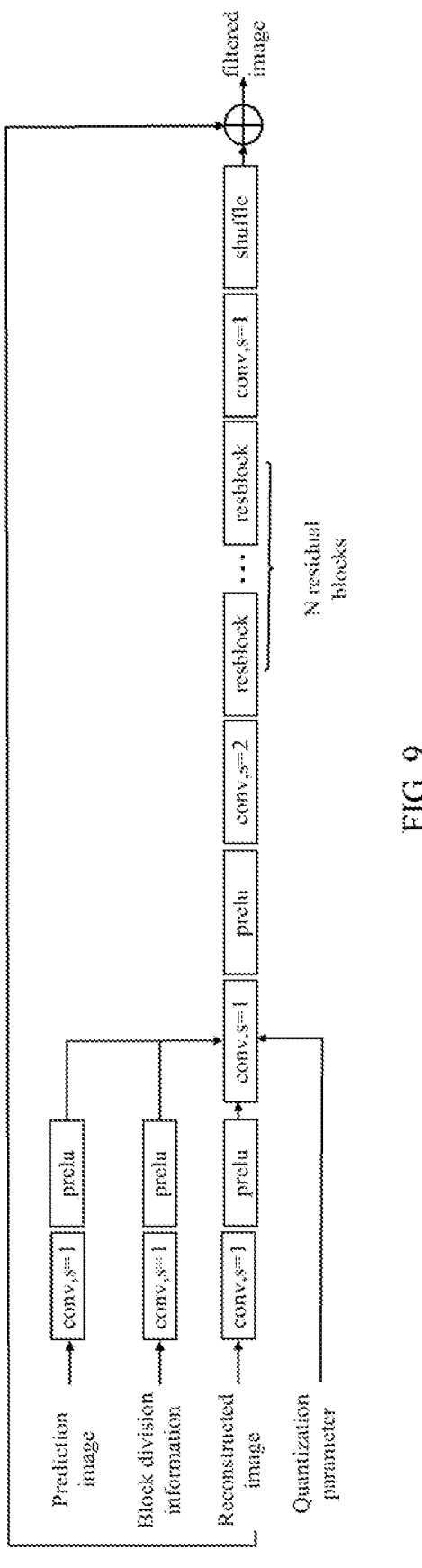
FIG. 9 shows a schematic diagram of generating an input parameter of a deep learning filter based on a reconstructed image and a quantization parameter of a coded image according to another embodiment of this disclosure.

As shown in FIG. 9, assuming that the reference information includes block division information and a prediction image, features may be extracted for the prediction image, the block division information, and the reconstructed image respectively by a convolutional unit (the convolutional unit includes a convolutional layer cony and a parametric rectified linear unit prelu, where the convolutional layer has a step size s=1). Then the features extracted respectively for the prediction image, the block division information and the reconstructed image, and the quantization parameter are inputted into the deep learning filter. The quantization parameter in the embodiment shown in FIG. 9 may be a sequence-level quantization parameter and a slice-level quantization parameter. As described above, if an image frame is divided into a slice, the quantization parameter in the embodiment shown in FIG. 9 may be a sequence-level quantization parameter and a frame-level quantization parameter.

In the embodiment shown in FIG. 9, the deep learning filter includes a convolutional unit, a residual unit, and a shuffle unit connected in sequence. The convolutional unit includes a convolutional layer with a step size s=1, a parametric rectified linear unit prelu, and a convolutional layer with a step size s=2. The residual unit includes N residual blocks connected in sequence. The shuffle unit is a shuffle unit. In the embodiment shown in FIG. 9, a convolutional layer may alternatively be disposed between the residual unit and the shuffle unit. This convolutional layer has a step size s=1.

As a modified embodiment of the embodiment shown in FIG. 9, the features of the quantization parameter may be first extracted by the convolutional unit, and then inputted into the deep learning filter together with the features extracted for the reference information.

In the embodiment shown in FIG. 9 and the modified embodiment of FIG. 9, the reference information includes, for example, block division information and a prediction image. In other embodiments of this disclosure, the reference information may be only the block division information or the prediction image. If the reference information does not include the prediction image, the embodiment shown in FIG. 9 and the modified embodiment thereof may remove a part of feature extraction of the prediction image by the convolutional unit. If the reference information does not include the block division information, the embodiment shown in FIG. 9 and the modified embodiment thereof may remove a part of feature extraction of the block division information by the convolutional unit.

In an embodiment, the block division information may be an image generated according to a block division result, and for example, may include at least one of the following images: a binary image generated according to a block division boundary; a binary image generated according to a filtering boundary of a deblocking filter; or a block division average image obtained by averaging in the same block as values of all sample points within the block according to a block division result for a to-be-filtered reconstructed image.

In an embodiment of this disclosure, the N residual blocks included in the residual unit may be any positive integer number (such as 1, 2, or 3) of residual blocks.

Figures 10, 11, 12:
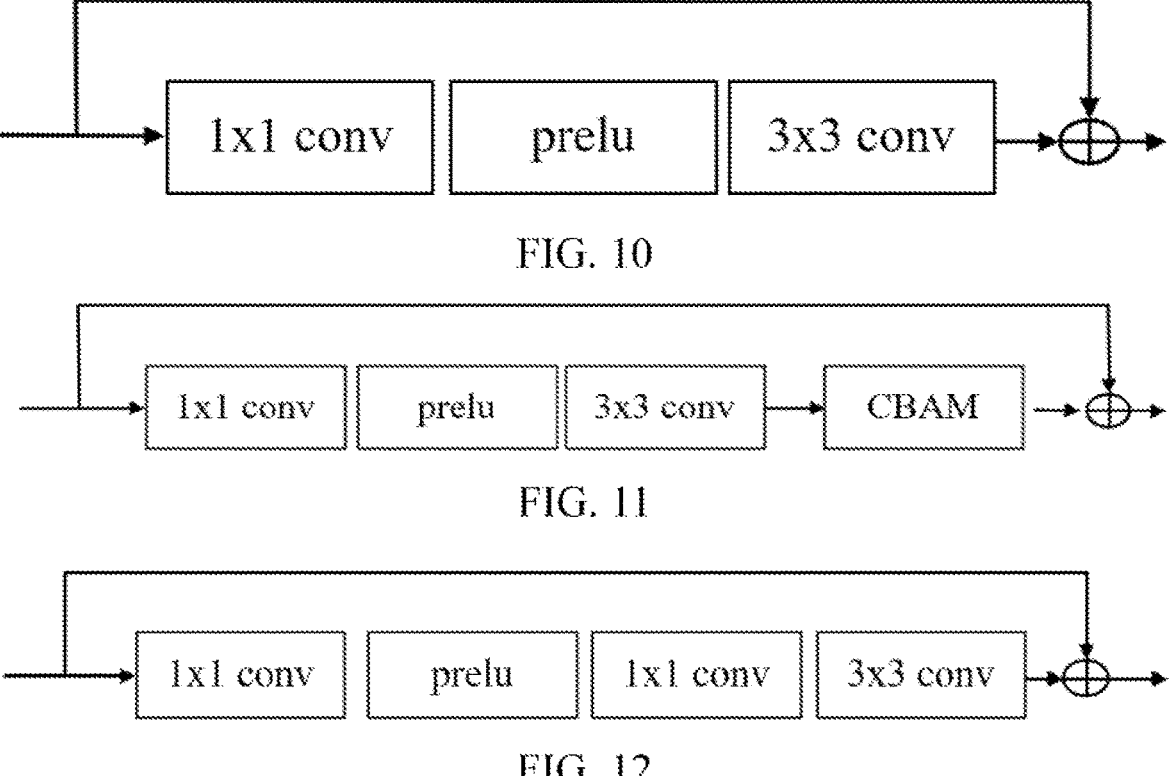
FIG. 10 shows a schematic structural diagram of a residual block according to an embodiment of this disclo-sure.
FIG. 11 shows a schematic structural diagram of a residual block according to another embodiment of this disclosure.
FIG. 12 shows a schematic structural diagram of a residual block according to another embodiment of this disclosure.

As shown in FIG. 10, the residual block in an embodiment of this disclosure may structurally include: a first convolutional layer (with a convolution kernel size 1×1), a parametric rectified linear unit, and a second convolutional layer (with a convolution kernel size 3×3) connected in sequence. An input of the first convolutional layer is taken as an input of the residual block, and a superimposition result of the input of the first convolutional layer and an output of the second convolutional layer is taken as an output of the residual block.

As shown in FIG. 11, the residual block in an embodiment of this disclosure may structurally include: a first convolutional layer (with a convolution kernel size 1×1), a parametric rectified linear unit, a second convolutional layer (with a convolution kernel size 3×3), and a convolutional block attention module (CBAM) connected in sequence. An input of the first convolutional layer is taken as an input of the residual block, and a superimposition result of the input of the first convolutional layer and an output of the convolutional block attention module is taken as an output of the residual block.

As shown in FIG. 12, the residual block in an embodiment of this disclosure may structurally include: a first convolutional layer (with a convolution kernel size 1×1), a parametric rectified linear unit, a third convolutional layer (with a convolution kernel size 1×1), and a second convolutional layer (with a convolution kernel size 3×3) connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the second convolutional layer is taken as an output of the residual block.

As shown in FIG. 13, the residual block in an embodiment of this disclosure may structurally include: a first convolutional layer (with a convolution kernel size 1×1), a parametric rectified linear unit, a third convolutional layer (with a convolution kernel size 1×1), a second convolutional layer (with a convolution kernel size 3×3), and a convolutional block attention module connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the convolutional block attention module is taken as an output of the residual block.

In an embodiment of this disclosure, one or more residual blocks may be included in the residual unit, and each residual block may adopt any one of the foregoing structures. The number of convolutional layers and prelu layers included in the convolutional unit of the deep learning filter may be set according to actual needs, and the number of convolutional layers and prelu layers included in the residual block may also be set according to actual needs. Meanwhile, the number of channels of different convolutional layers may or may not be the same.

With reference to FIG. 6, in step S630, the generated input parameter is inputted to the deep learning filter to obtain a filtered image that is outputted by the deep learning filter and corresponds to the reconstructed image.

In an embodiment of this disclosure, the same parameter as that in applications is used as an input when the deep learning filter is trained. Specifically, in the training stage, a sample reconstructed image and a corresponding quantization parameter (the quantization parameter includes at least one of a frame-level quantization parameter, a slice-level quantization parameter, and a block-level quantization parameter, which are specifically adjusted according to a use scenario of the deep learning filter, namely, matching a parameter used by the deep learning filter when used) need to be obtained. Then an input parameter for training is generated according to the sample reconstructed image and the quantization parameter, and the obtained input parameter is inputted into the deep learning filter. The parameters of the deep learning filter are adjusted according to a loss value between an output of the deep learning filter and an expected filtering result image corresponding to the sample reconstructed image, and the process is repeated until the deep learning filter satisfies a convergence condition.

On the basis of the deep learning-based filtering method shown in FIG. 6, a video coding method is also provided in the embodiments of this disclosure. The video coding method may be performed by a device having a processing function such as computing and storage. For example, the video coding method may be performed by a terminal device or a server. The specific flow is shown in FIG. 14, and includes the following steps S1410 to S1440.

In step S1410, a reconstructed image corresponding to a coded image and a quantization parameter of the coded image are obtained. The quantization parameter includes at least one of a frame-level quantization parameter, a slice-level quantization parameter, and a block-level quantization parameter corresponding to the coded image.

For example, details of this step may be referred to the foregoing step S610 and will not be described again.

In step S1420, an input parameter of a deep learning filter is generated according to the reconstructed image and the quantization parameter of the coded image.

For example, details of this step may be referred to the foregoing step S620 and will not be described again.

In step S1430, the generated input parameter is inputted to the deep learning filter to obtain a filtered image that is outputted by the deep learning filter and corresponds to the reconstructed image.

In step S1440, a prediction image of a next frame of video image is generated based on the filtered image, and the next frame of video image is coded based on the prediction image.

In this embodiment, after the filtered image is generated, reference may be made to the flow shown in FIG. 3. That is, the filtered image is used as a next frame of reference image to perform motion estimation and motion compensation prediction. Then a next frame of prediction image signal is obtained based on a result of motion compensation prediction and a result of intra-frame prediction, and the flow shown in FIG. 3 continues to be repeated until coding of a video image is completed.

Accordingly, on the basis of the deep learning-based filtering method shown in FIG. 6, a video decoding method is also provided in the embodiments of this disclosure. The video decoding method may be performed by a device having a processing function such as computing and storage. For example, the video decoding method may be performed by a terminal device or a server. The specific flow is shown in FIG. 15, and includes the following steps S1510 to S1540.

In step S1510, a reconstructed image corresponding to a coded image and a quantization parameter of the coded image are obtained. The quantization parameter includes at least one of a frame-level quantization parameter, a slice-level quantization parameter, and a block-level quantization parameter corresponding to the coded image.

For example, details of this step may be referred to the foregoing step S610 and will not be described again.

In step S1520, an input parameter of a deep learning filter is generated according to the reconstructed image and the quantization parameter of the coded image.

For example, details of this step may be referred to the foregoing step S620 and will not be described again.

In step S1530, the generated input parameter is inputted to the deep learning filter to obtain a filtered image that is outputted by the deep learning filter and corresponds to the reconstructed image.

In step S1540, a prediction image of a next frame of video image is generated based on the filtered image, and a video stream is decoded based on the generated prediction image.

In this embodiment, after a filtered image is generated, motion estimation and motion compensation prediction may be performed on the filtered image as a next frame of reference image. Then a next frame of prediction image signal is obtained based on a result of motion compensation prediction and a result of intra-frame prediction. The prediction image signal is superimposed again with a reconstructed residual signal obtained by performing inverse quantization and inverse transform processing to generate a next frame of reconstructed image information, and this process is repeated to realize the decoding processing of a video stream.

In the technical solutions of the embodiments of this disclosure, a fine-grained quantization parameter (such as at least one of a frame-level quantization parameter, a slice-level quantization parameter, and a block-level quantization parameter) directly affecting image quality may be used as an input of a deep learning filter, and then the recognition accuracy of the deep learning filter on an inputted reconstructed image can be improved by introducing the fine-grained quantization parameter, thereby improving a filtering effect and being advantageous for improving video coding and decoding efficiency.

The following describes apparatus embodiments of this disclosure that may be used to perform the deep learning-based filtering method according to the foregoing embodiments of this disclosure. For details not disclosed in the apparatus embodiments of this disclosure, reference is made to the embodiments of the foregoing deep learning-based filtering method according to this disclosure.

FIG. 16 shows a block diagram of a deep learning-based filtering apparatus according to an embodiment of this disclosure. The deep learning-based filtering apparatus may be disposed in a device having a processing function such as computing and storage. For example, the deep learning-based filtering apparatus may be disposed in a terminal device or a server.

Referring to FIG. 16, a deep learning-based filtering apparatus 1600 according to an embodiment of this disclosure includes: an obtaining unit 1602, a generation unit 1604, and a processing unit 1606.

The obtaining unit 1602 is configured to obtain a reconstructed image corresponding to a coded image and a quantization parameter of the coded image. The quantization parameter includes at least one of a frame-level quantization parameter, a slice-level quantization parameter, and a block-level quantization parameter corresponding to the coded image. The generation unit 1604 is configured to generate an input parameter of a deep learning filter according to the reconstructed image and the quantization parameter. The processing unit 1606 is configured to input the input parameter to the deep learning filter to obtain a filtered image that is outputted by the deep learning filter and corresponds to the reconstructed image.

In some embodiments of this disclosure, based on the foregoing solution, the quantization parameter further includes: a sequence-level quantization parameter corresponding to the coded image.

In some embodiments of this disclosure, based on the foregoing solution, the generation unit 1604 is configured to: perform layer combination on the reconstructed image and the quantization parameter, and taking a result of the layer combination as the input parameter of the deep learning filter.

In some embodiments of this disclosure, based on the foregoing solution, the generation unit 1604 is configured to: perform a point multiplication operation on the reconstructed image and the quantization parameter to obtain a point multiplication operation result; perform a convolutional operation on the point multiplication operation result; and generate the input parameter of the deep learning filter according to features obtained by the convolutional operation and features of the reconstructed image.

In some embodiments of this disclosure, based on the foregoing solution, the generation unit 1604 is configured to: obtain reference information corresponding to the reconstructed image, the reference information including at least one of block division information and a prediction image; perform a convolutional operation on the reference information to obtain features of the reference information; and generate the input parameter of the deep learning filter according to the features of the reference information, features of the reconstructed image, and the quantization parameter.

In some embodiments of this disclosure, based on the foregoing solution, the deep learning filter includes a convolutional unit, a residual unit, and a shuffle unit connected in sequence. The residual unit includes at least one residual block.

In some embodiments of this disclosure, based on the foregoing solution, if the residual unit includes a plurality of residual blocks, the number of channels of the plurality of residual blocks is the same, or the number of channels of each of the residual blocks is not exactly the same.

In some embodiments of this disclosure, based on the foregoing solution, one of the residual blocks includes: a first convolutional layer, a parametric rectified linear unit, and a second convolutional layer connected in sequence. An input of the first convolutional layer is taken as an input of the residual block, and a superimposition result of the input of the first convolutional layer and an output of the second convolutional layer is taken as an output of the residual block.

In some embodiments of this disclosure, based on the foregoing solution, one of the residual blocks includes: a first convolutional layer, a parametric rectified linear unit, a second convolutional layer, and a convolutional block attention module connected in sequence. An input of the first convolutional layer is taken as an input of the residual block, and a superimposition result of the input of the first convolutional layer and an output of the convolutional block attention module is taken as an output of the residual block.

In some embodiments of this disclosure, based on the foregoing solution, one of the residual blocks includes: a first convolutional layer, a parametric rectified linear unit, a third convolutional layer, and a second convolutional layer connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the second convolutional layer is taken as an output of the residual block.

In some embodiments of this disclosure, based on the foregoing solution, one of the residual blocks includes: a first convolutional layer, a parametric rectified linear unit, a third convolutional layer, a second convolutional layer, and a convolutional block attention module connected in sequence. A convolution kernel of the first convolutional layer has the same size as a convolution kernel of the third convolutional layer, an input of the first convolutional layer is taken as an input of the residual block, and a superimposition result of the input of the first convolutional layer and an output of the convolutional block attention module is taken as an output of the residual block.

Figure 17:
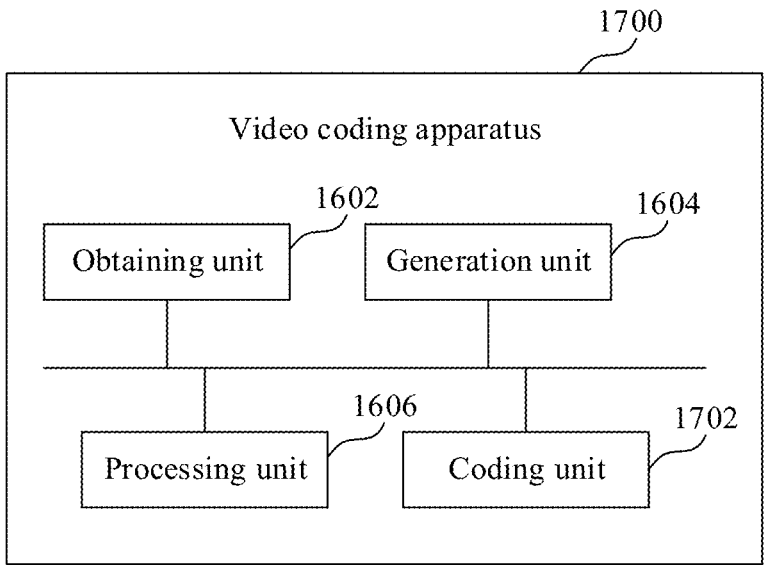
FIG. 17 shows a block diagram of a video coding apparatus according to an embodiment of this disclosure.

FIG. 17 shows a block diagram of a video coding apparatus according to an embodiment of this disclosure. The video coding apparatus may be disposed in a device having a processing function such as computing and storage. For example, the video coding apparatus may be disposed in a terminal device or a server.

Referring to FIG. 17, a video coding apparatus 1700 according to an embodiment of this disclosure includes: an obtaining unit 1602, a generation unit 1604, a processing unit 1606, and a coding unit 1702.

The obtaining unit 1602 is configured to obtain a reconstructed image corresponding to a coded image and a quantization parameter of the coded image. The quantization parameter includes at least one of a frame-level quantization parameter, a slice-level quantization parameter, and a block-level quantization parameter corresponding to the coded image. The generation unit 1604 is configured to generate an input parameter of a deep learning filter according to the reconstructed image and the quantization parameter. The processing unit 1606 is configured to input the input parameter to the deep learning filter to obtain a filtered image that is outputted by the deep learning filter and corresponds to the reconstructed image. The coding unit 1702 is configured to generate a prediction image of a next frame of video image based on the filtered image, and code the next frame of video image based on the prediction image.

Figure 18:
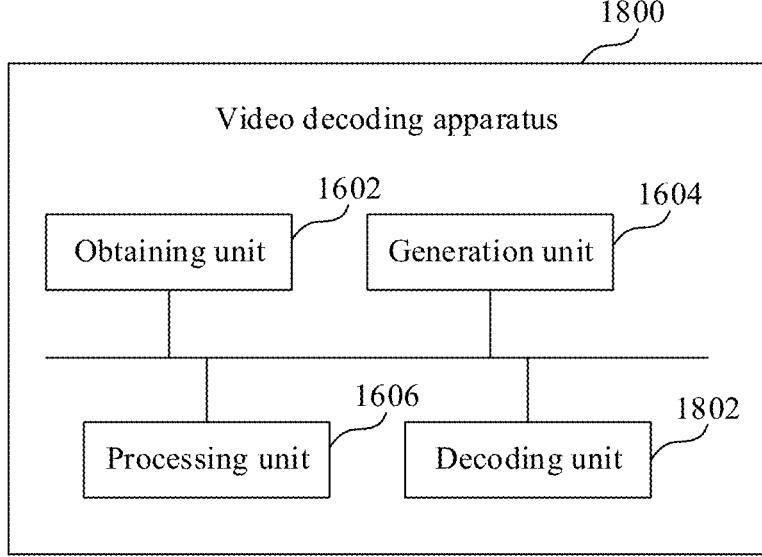
FIG. 18 shows a block diagram of a video decoding apparatus according to an embodiment of this disclosure.

FIG. 18 shows a block diagram of a video decoding apparatus according to an embodiment of this disclosure. The video decoding apparatus may be disposed in a device having a processing function such as computing and storage. For example, the video decoding apparatus may be disposed in a terminal device or a server.

Referring to FIG. 18, a video decoding apparatus 1800 according to an embodiment of this disclosure includes: an obtaining unit 1602, a generation unit 1604, a processing unit 1606, and a decoding unit 1802.

The obtaining unit 1602 is configured to obtain a reconstructed image corresponding to a coded image and a quantization parameter of the coded image. The quantization parameter includes at least one of a frame-level quantization parameter, a slice-level quantization parameter, and a block-level quantization parameter corresponding to the coded image. The generation unit 1604 is configured to generate an input parameter of a deep learning filter according to the reconstructed image and the quantization parameter. The processing unit 1606 is configured to input the input parameter to the deep learning filter to obtain a filtered image that is outputted by the deep learning filter and corresponds to the reconstructed image. The decoding unit 1802 is configured to generate a prediction image of a next frame of video image based on the filtered image, and decode a video stream based on the prediction image.

Figure 19:
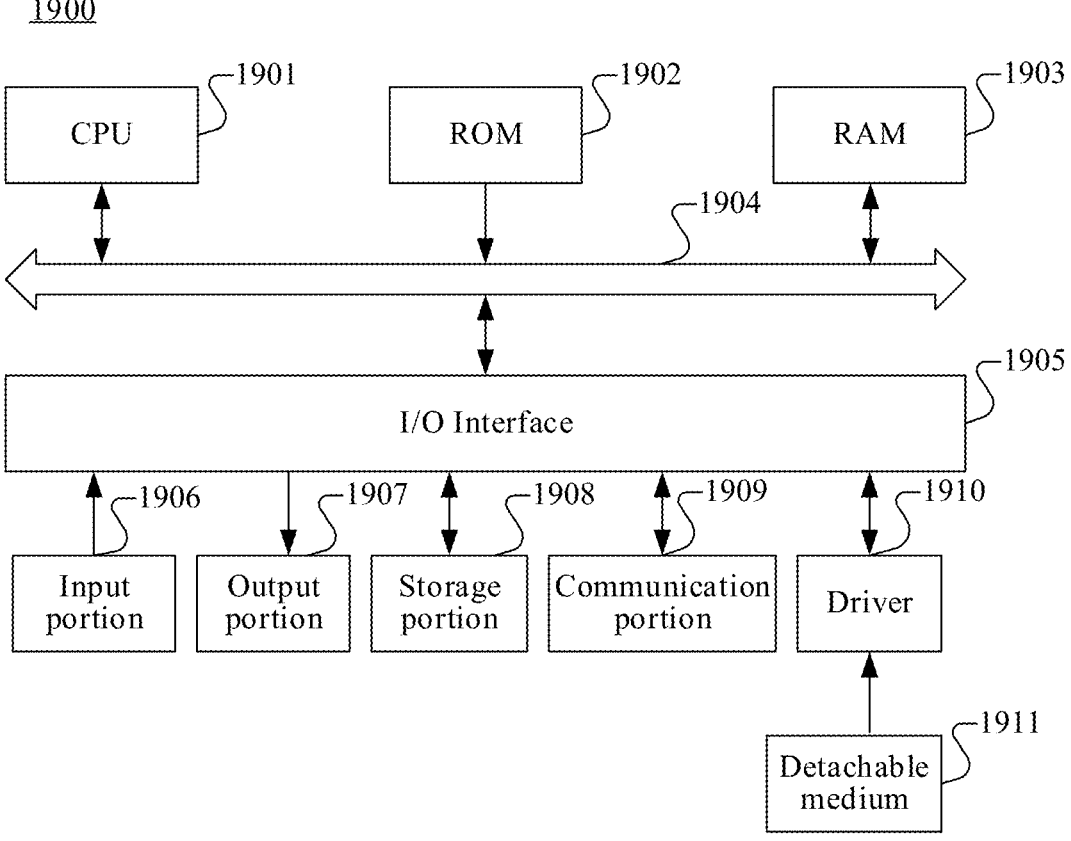
FIG. 19 is a schematic structural diagram of a computer system adapted to implement an electronic device according to an embodiment of this disclosure.

FIG. 19 is a schematic structural diagram of a computer system adapted to implement an electronic device according to an embodiment of this disclosure.

A computer system 1900 of an electronic device shown in FIG. 19 is merely an example and may not pose any limitation on the scope of functionality or use of the embodiments of this disclosure.

As shown in FIG. 19, the computer system 1900 includes a central processing unit (CPU) 1901, which may perform various suitable actions and processing based on a program stored in a read-only memory (ROM) 1902 or a program loaded from a storage portion 1908 into a random access memory (RAM) 1903, for example, perform the method described in the foregoing embodiments. In the RAM 1903, various programs and data required for system operation are also stored. The CPU 1901, the ROM 1902, and the RAM 1903 are connected to each other through a bus 1904. An input/output (I/O) interface 1905 is also connected to the bus 1904.

The following components are connected to the I/O interface 1905: an input portion 1906 including a keyboard, a mouse, and the like; an output portion 1907 including, for example, a cathode ray tube (CRT), a liquid crystal display (LCD), a speaker, and the like; a storage portion 1908 including a hard disk, and the like; and a communication portion 1909 including, for example, a network interface card such as a local area network (LAN) card and a modem. The communication portion 1909 performs communication processing via a network such as the Internet. A driver 1910 is also connected to the I/O interface 1905 as required. A detachable medium 1911, such as a magnetic disk, an optical disk, a magneto-optical disk, or a semiconductor memory, is installed on the driver 1910 as needed so that a computer program read therefrom is installed into the storage portion 1908 as required.

Particularly, according to the embodiments of this disclosure, the processes described in the following by referring to the flowcharts may be implemented as computer software programs. For example, the embodiments of this disclosure include a computer program product. The computer program product includes a computer program stored in a computer-readable medium (e.g., non-transitory computer-readable storage medium). The computer program includes a computer program used for performing a method shown in the flowchart. In such embodiments, the computer program may be downloaded and installed over the network through the communication portion 1909, and/or installed from the detachable medium 1911. When the computer program is executed by the CPU 1901, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. More examples of the computer-readable storage medium may include, but are not limited to: an electrical connector having one or more wires, a portable computer disk, a hard disk, a random access memory (RAM), a read-only memory (ROM), an erasable programmable read only memory (EPROM), a flash memory, an optical fiber, a compact disc read-only memory (CD-ROM), an optical storage device, a magnetic storage device, or any suitable combination thereof. In this disclosure, the computer-readable storage medium may be any tangible medium containing or storing a program, and the program may be used by or used in combination with an instruction execution system, an apparatus, or a device. In this disclosure, the computer-readable signal medium may include a data signal transmitted in a baseband or as part of a carrier, and carries a computer-readable computer program therein. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. A computer program contained on the computer-readable medium may be transmitted over any suitable medium including, but not limited to: a wireless manner, a wired manner, or any suitable combination thereof.

The flowcharts and block diagrams in the accompanying drawings illustrate possible system architectures, functions and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some alternative implementations, the functions labeled in the blocks may occur out of the order labeled in the accompanying drawings. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using processing circuitry, such as one or more processors (or processors and memory). Likewise, a processor (or processors and memory) can be used to implement one or more modules. Moreover, each module can be part of an overall module that includes the functionalities of the module. For example, a unit described in the embodiments of this disclosure may be implemented in a software manner, or may be implemented in a hardware manner, and the unit described may also be disposed in a processor. The names of these units do not, in some cases, constitute a limitation on the units.

As another aspect, this disclosure also provides a computer-readable medium (e.g., non-transitory computer-readable storage medium). The computer-readable medium may be included in the electronic device described in the foregoing embodiments. The computer-readable medium may alternatively exist separately and is not fitted into the electronic device. The computer-readable medium carries one or more programs. The one or more programs, when executed by the electronic device, enable the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be implemented in one module or unit. On the contrary, the features and functions of one module or unit described above may be further divided to be embodied by a plurality of modules or units.

According to the foregoing descriptions of the implementations, the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of this disclosure.

This disclosure is intended to cover any variations, uses, or adaptive changes of this disclosure, which follow the general principles of this disclosure and include known or customary technological means in the art not disclosed by this disclosure.

It is to be understood that this disclosure is not limited to the precise structures described above and shown in the accompanying drawings, and various modifications and changes may be made without departing from the scope of this disclosure.

What is claimed is:

1. A method of deep learning-based filtering, comprising:
obtaining a reconstructed image corresponding to a coded image and at least a quantization parameter, at least a portion of the reconstructed image being reconstructed based on the quantization parameter;
generating an input to a deep learning filter according to a point multiplication operation of the reconstructed image and the at least the quantization parameter, the point multiplication operation including pixel-wise multiplications of the at least the portion of the reconstructed image with the quantization parameter; and
generating, by the deep learning filter and in response to the input, a filtered image corresponding to the reconstructed image,
wherein the generating the input of the deep learning filter includes:
performing the point multiplication operation to obtain a point multiplication operation resulting image;
extracting first features of the reconstructed image;
extracting second features of the point multiplication operation resulting image; and
generating the input to the deep learning filter according to the first features of the reconstructed image and the second features of the point multiplication operation resulting image.

2. The method according to claim 1, wherein the quantization parameter is a sequence-level quantization parameter for a reconstruction of a sequence of images including the reconstructed image.

3. The method according to claim 1, wherein the quantization parameter is at least one of
a frame level quantization parameter for a reconstruction of the reconstructed image,
a slice level quantization parameter for a reconstruction of a slice of the reconstructed image, or
a block level quantization parameter for a reconstruction of a block of the reconstructed image.

4. The method according to claim 1, wherein
the extracting the first features includes:
performing a first convolution operation on the reconstructed image to obtain the first features, and
the extracting the second features includes:
performing a second convolution operation on the point multiplication operation resulting image to obtain the second features.

5. The method according to claim 1, wherein the deep learning filter comprises a convolutional unit, a residual unit, and a shuffle unit connected in sequence, and the residual unit comprises at least a residual block.

6. The method according to claim 5, wherein the residual block comprises a first convolutional layer, a parametric rectified linear unit and a second convolutional layer connected in sequence, a block input of the residual block is a layer input of the first convolutional layer, and a layer output of the second convolutional layer is superimposed with the layer input of the first convolutional layer to generate a block output of the residual block.

7. The method according to claim 5, wherein the residual block comprises a first convolutional layer, a parametric rectified linear unit, a second convolutional layer and a convolutional block attention module connected in sequence, a block input of the residual block is a layer input of the first convolutional layer, and a module output of the convolutional block attention module is superimposed with the layer input of the first convolutional layer to generate a block output of the residual block.

8. The method according to claim 5, wherein the residual block comprises a first convolutional layer, a parametric rectified linear unit, a third convolutional layer and a second convolutional layer connected in sequence, a convolution kernel of the first convolutional layer has a same size as a convolution kernel of the third convolutional layer, a block input of the residual block is a layer input of the first convolutional layer, and a layer output of the second convolutional layer is superimposed with the layer input of the first convolutional layer to generate a block output of the residual block.

9. The method according to claim 5, wherein the residual block comprises a first convolutional layer, a parametric rectified linear unit, a third convolutional layer, a second convolutional layer and a convolutional block attention module connected in sequence, a convolution kernel of the first convolutional layer has a same size as a convolution kernel of the third convolutional layer, a block input of the residual block is a layer input of the first convolutional layer, and a module output of the convolutional block attention module is superimposed with the layer input of the first convolutional layer to generate a block output of the residual block.

10. An apparatus, comprising processing circuitry configured to:
obtain a reconstructed image corresponding to a coded image and at least a quantization parameter, at least a portion of the reconstructed image being reconstructed based on the quantization parameter;
generate an input to a deep learning filter according to a point multiplication operation of the reconstructed image and the at least the quantization parameter, the point multiplication operation including pixel-wise multiplications of the at least the portion of the reconstructed image with the quantization parameter; and
generate, by the deep learning filter and in response to the input, a filtered image corresponding to the reconstructed image,
wherein, to generate the input to the deep learning filter, the processing circuitry is configured to:
perform the point multiplication operation to obtain a point multiplication operation resulting image;
extract first features of the reconstructed image;
extract second features of the point multiplication operation resulting image; and
generate the input to the deep learning filter according to the first features of the reconstructed image and the second features of the point multiplication operation resulting image.

11. The apparatus according to claim 10, wherein the quantization parameter is at least one of
a frame level quantization parameter for a reconstruction of the reconstructed image,
a slice level quantization parameter for a reconstruction of a slice of the reconstructed image, or
a block level quantization parameter for a reconstruction of a block of the reconstructed image.

12. The apparatus according to claim 10, wherein
to extract the first features, the processing circuitry is configured to:
perform a first convolution operation on the reconstructed image to obtain the first features, and
to extract the second features, the processing circuitry is configured to:
perform a second convolution operation on the point multiplication operation resulting image to obtain the second features.

13. The apparatus according to claim 10, wherein the deep learning filter comprises a convolutional unit, a residual unit, and a shuffle unit connected in sequence, and the residual unit comprises at least a residual block.

14. The apparatus according to claim 13, wherein the residual block comprises a first convolutional layer, a parametric rectified linear unit and a second convolutional layer connected in sequence, a block input of the residual block is a layer input of the first convolutional layer, and a layer output of the second convolutional layer is superimposed with the layer input of the first convolutional layer to generate a block output of the residual block.

15. The apparatus according to claim 13, wherein the residual block comprises a first convolutional layer, a parametric rectified linear unit, a second convolutional layer and a convolutional block attention module connected in sequence, a block input of the residual block is a layer input of the first convolutional layer, and a module output of the convolutional block attention module is superimposed with the layer input of the first convolutional layer to generate a block output of the residual block.

16. The apparatus according to claim 13, wherein the residual block comprises a first convolutional layer, a parametric rectified linear unit, a third convolutional layer and a second convolutional layer connected in sequence, a convolution kernel of the first convolutional layer has a same size as a convolution kernel of the third convolutional layer, a block input of the residual block is a layer input of the first convolutional layer, and a layer output of the second convolutional layer is superimposed with the layer input of the first convolutional layer to generate a block output of the residual block.

17. The apparatus according to claim 13, wherein the residual block comprises a first convolutional layer, a parametric rectified linear unit, a third convolutional layer, a second convolutional layer and a convolutional block attention module connected in sequence, a convolution kernel of the first convolutional layer has a same size as a convolution kernel of the third convolutional layer, a block input of the residual block is a layer input of the first convolutional layer, and a module output of the convolutional block attention module is superimposed with the layer input of the first convolutional layer to generate a block output of the residual block.

18. A non-transitory computer-readable storage medium, configured to store a computer program for causing a computer to perform a method of deep learning-based filtering, executed by one or more processors, the method comprising:

obtaining a reconstructed image corresponding to a coded image and at least a quantization parameter, at least a portion of the reconstructed image being reconstructed based on the quantization parameter;

generating an input to a deep learning filter according to a point multiplication operation of the reconstructed image and the at least the quantization parameter, the point multiplication operation including pixel-wise multiplications of the at least the portion of the reconstructed image with the quantization parameter; and generating, by the deep learning filter and in response to the input, a filtered image corresponding to the reconstructed image, wherein the generating the input of the deep learning filter includes:

performing the point multiplication operation to obtain a point multiplication operation resulting image;

extracting first features of the reconstructed image;

extracting second features of the point multiplication operation resulting image; and generating the input to the deep learning filter according to the first features of the reconstructed image and the second features of the point multiplication operation resulting image.

19. The non-transitory computer-readable storage medium according to claim 18, wherein the extracting the first features includes:

performing a first convolution operation on the reconstructed image to obtain the first features, and the extracting the second features includes:

performing a second convolution operation on the point multiplication operation resulting image to obtain the second features.

20. The non-transitory computer-readable storage medium according to claim 18, wherein the deep learning filter comprises a convolutional unit, a residual unit, and a shuffle unit connected in sequence, and the residual unit comprises at least a residual block.

* * * * *